United States Patent [19]

Warman et al.

[11] Patent Number: 4,531,453
[45] Date of Patent: Jul. 30, 1985

[54] ATMOSPHERE CONTROL ARRANGEMENT FOR AN OPERATOR ENCLOSURE

[75] Inventors: Bruce L. Warman, Silvis, Ill.; Carl W. Dailey, Bettendorf, Iowa; Floyd D. Johnson, Moline, Ill.

[73] Assignee: Deere & Company, Moline, Ill.

[21] Appl. No.: 495,320

[22] Filed: May 16, 1983

[51] Int. Cl.³ .............................................. B60H 3/06
[52] U.S. Cl. ...................................... 98/2.11; 55/330; 55/332; 55/436; 55/443
[58] Field of Search ................. 55/308, 330, 332, 338, 55/436, 443; 98/2, 2.11, 38 E, 38 F

[56] References Cited

U.S. PATENT DOCUMENTS

| | | | |
|---|---|---|---|
| 3,237,386 | 3/1966 | Farr et al. | 55/443 |
| 3,355,864 | 12/1967 | Sobeck | 55/443 |
| 3,378,994 | 4/1968 | Farr | 55/443 |
| 4,365,541 | 12/1982 | Marques et al. | 98/2.11 |

Primary Examiner—Harold Joyce

[57] ABSTRACT

An atmosphere control system for the cab of a self-propelled combine has its principal components arranged for series flow and mounted compactly on a rear portion of the floor of the cab. A pressurizing blower injects fresh air into an upstream filter chamber through a translational inertial precleaner which discharges any removed dust along with bleed air vertically downwards through the floor of the cab. A filter further cleans fresh air as it continues into the system, to pass through a heat exchanger and into circulation by a circulation blower and suitable ducting. Both precleaner and fresh air filter are accessible through a door in an outside wall of the cab.

11 Claims, 6 Drawing Figures

ATMOSPHERE CONTROL ARRANGEMENT FOR AN OPERATOR ENCLOSURE

BACKGROUND OF THE INVENTION

This invention concerns control of the atmosphere in an operator enclosure of a self-propelled vehicle and, more particularly, the arrangement and combination of components within the enclosure of an off-the-road vehicle exposed to heavy concentrations of airborne dust and debris.

Concern for operator safety and comfort leads to the development of increasingly sophisticated operator enclosures (which, however, are still generally referred to as cabs). It is well-known that modern cab design deals not only with ergonomic considerations but also with the more passive environmental factors such as roll-over protection, isolation from noise and preservation of a comfortable and clean atmosphere. The present invention is concerned principally with the latter but improvement of atmosphere control in cabs is clearly most advantageously used in an operator station or enclosure in which other comfort and safety considerations have been adequately provided for. It is well-known, in a completely encloed cab, to provide an atmosphere control system which takes in and filters outside air, heats or cools the air as required, and circulates it in the cab while maintaining pressure in the cab slightly above atmospheric, so as to discourage the entry of dust or other contaminants through, for example, imperfectly sealed doors or windows. Efforts are still being made to improve the efficiency, serviceability and compactness of such systems. Means are sometimes provided for precleaning the intake air but typically precleaners are remote from the main components of the system and unsightly and fitted as an attachment or add-on rather than integrated into the system.

SUMMARY OF THE INVENTION

Accordingly, it is an object of the invention to provide for the operator enclosure of an off-the-road self-propelled vehicle, such as an agricultural tractor or combine, an atmosphere control arrangement which is compact, convenient to assemble, service and repair, and which is efficient in operation.

It is a feature of the invention to arragne all principal components in series with a view to efficiency in operation and simplicity of housing and ducting the components. In a preferred embodiment, there is a single (preferably elevated) inlet for fresh air intake and essentially a single outlet for circulating and pressurizing air combined. The system sequence is as follows: fresh air inlet, pressurizing blower, precleaner, fresh air filter, heat exchanger, circulating blower. Features which modify the simple series arrangement may include the precleaner being of the inertial (preferably translational) type in which case dust or dirt extracted is exhausted or ejected to atmosphere while the bulk of inlet air passes on to the fresh air filter. Another modifying feature may be the provision of a filtered inlet for admitting recirculated air into the system, upstream of the heat exchanger. Preferably the outflow of combined circulating and pressurizing air from the circulating blower will be distributed appropriately in the enclosure by suitable ducting. It will be understood that the incoming fresh air delivered by the pressurizing blower functions not only to maintain a positive pressure within the enclosure but also to make up air intentionally lost through "leaks" in the enclosure. Make-up air is required to maintain an acceptable level of air quality.

The simplicity of the series arrangement of components facilitiates the provision of a split housing for the components comprising principally upper and lower halves mating or meeting at a generally horizontal parting line. The lower half may be seated on the floor of the operator enclosure and may include molded forms for positioning and support of components such as the heat exchanger and recirculating air filter and precleaner, final completion of assembly and retention of components in place being made by placing the upper casing half in position.

It is a feature of the invention that a generally upstream compartment of the housing, defined locally by internally projecting portions of the upper and lower casing halves, may contain the precleaner and have, in one of its walls, an aperture covered by the main fresh air filter of the system. Preferably this filter compartment includes a wall adjacent or coincident with an external wall of the operator enclosure thus facilitating service access to the filter compartment. Preferably, molded and vertically aligned features in the upper and lower portions of the casing respectively receive and hold the precleaner with its inlet and bleed air outlet registering with opposite apertures in the casing. Thus the principal axis of air flow in the precleaner is vertically aligned and a dust and dirt outlet is readily provided in the floor of the operator enclosure. Preferably the pressurizing blower has an air delivery outlet directed downwards and communicating directly with the precleaner so that charging of the precleaner is direct and efficient.

Other objects and advantages of the invention will become apparent from reading the description which follows.

DESCRIPTION OF THE PREFERRED EMBODIMENT

Figure 1:
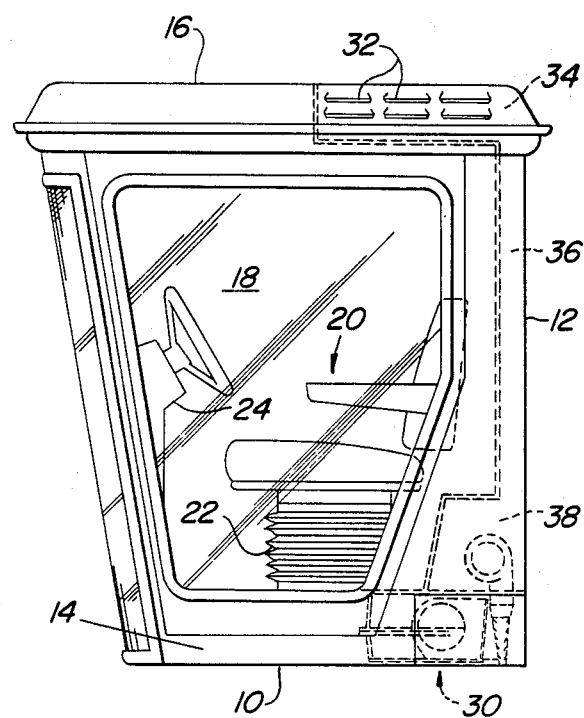
FIG. 1 is a left-hand side elevation of an operator enclosure embodying the invention.

The invention is embodied in the operator's station and enclosure of a self-propelled combine harvester shown in FIG. 1.

The enclosure is generally rectangular in shape and includes a floor 10, rear wall 12, opposite side walls 14 and a roof 16. There is an access door 18 in the left-hand side wall 14. The operator station includes a seat 20 supported on a seat pedestal 22, a steering column 24 and various controls and equipment not shown in the drawing.

The general disposition of the enclosure atmosphere control system 30 is indicated in FIG. 1. The bulk of the system is supported on the floor 10 of the enclosure close to the rear wall 12. Clean make-up air for the system enters through louvers 32 in the roof 16 into a plenum 34 and thence by a duct 36 extending vertically downwards close to the rear left-hand corner of the enclosure, to broaden into a blower plenum area 38 immediately above the atmosphere control system 30.

Figure 2:
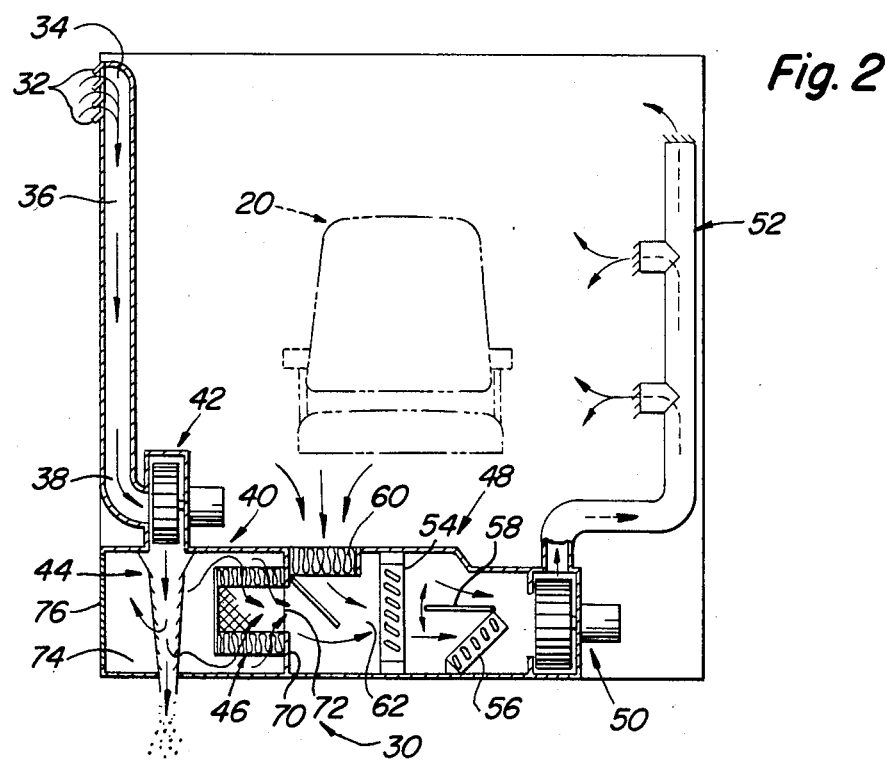
FIG. 2 is a simplified schematic of the atompshere control system based on a rear view of the operator enclosure of FIG. 1. The spatial relationship of components have been modified somewhat to simplify this representation of their functional relationships.

The sequential and functional relationship of the principal components of the atmosphere control system are shown schematically in FIG. 2. This drawing is semi-pictorial but the orientation and disposition of some of the components has been changed somewhat for clarity. Casing 40 essentially houses all the main components including a pressurizing blower 42, precleaner 44, fresh air filter 46, heat exhanger 48, recirculating blower 50 and connects with distribution ducting 52. The heat exchanger 48 includes an evaporator (air conditioning) 54, a heater coil 56 and an adjustable air deflector or baffle 58. Recirculating air is admitted to the casing 40 through a recirculating air filter 60 into an air mixing chamber 62, downstream of the fresh air filter 46.

Figure 3:
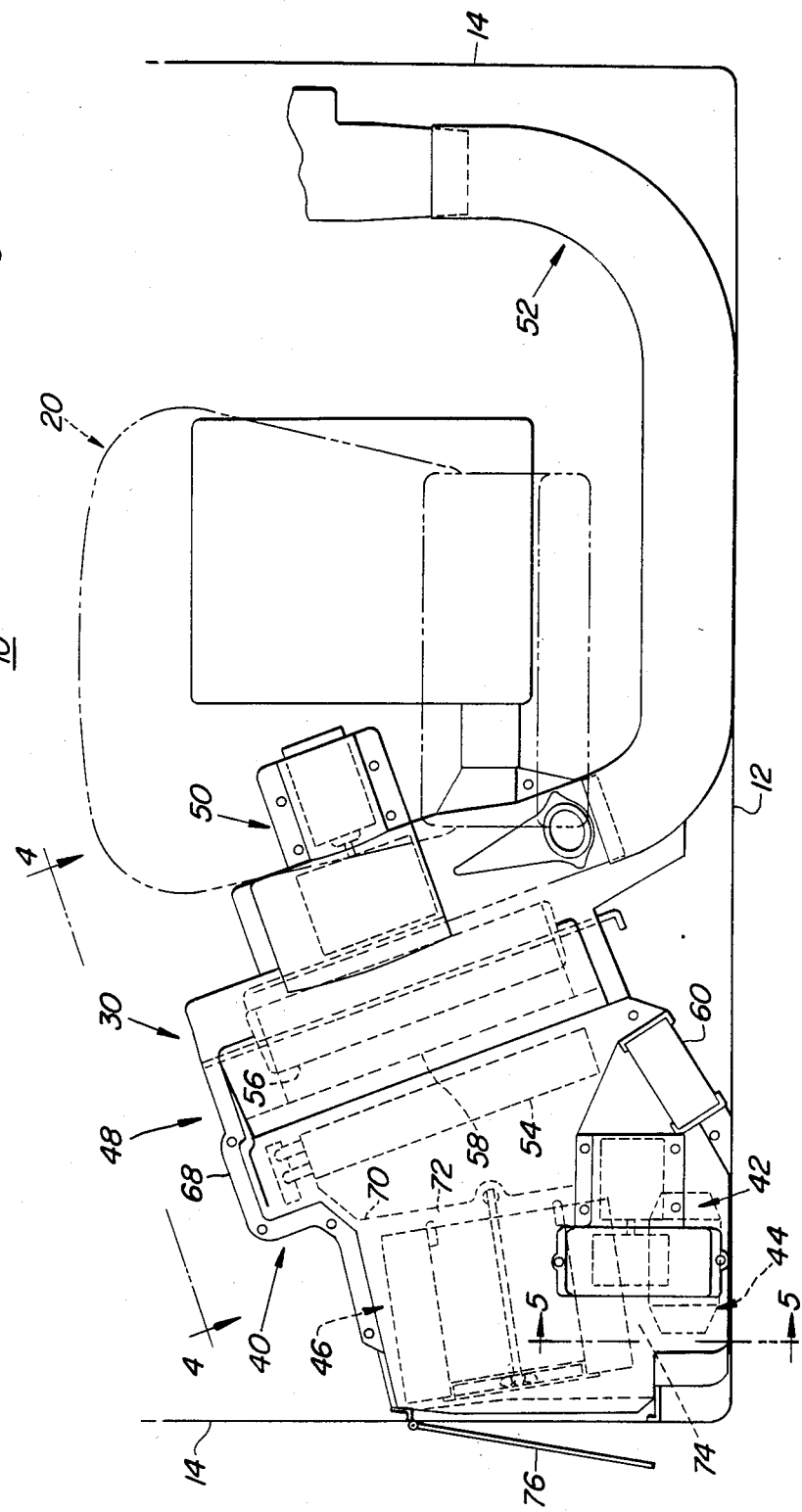
FIG. 3 is an enlarged overhead view of the rearward lower portion of the operator enclosure showing the general arrangement of the system within the enclosure.
Figure 4:
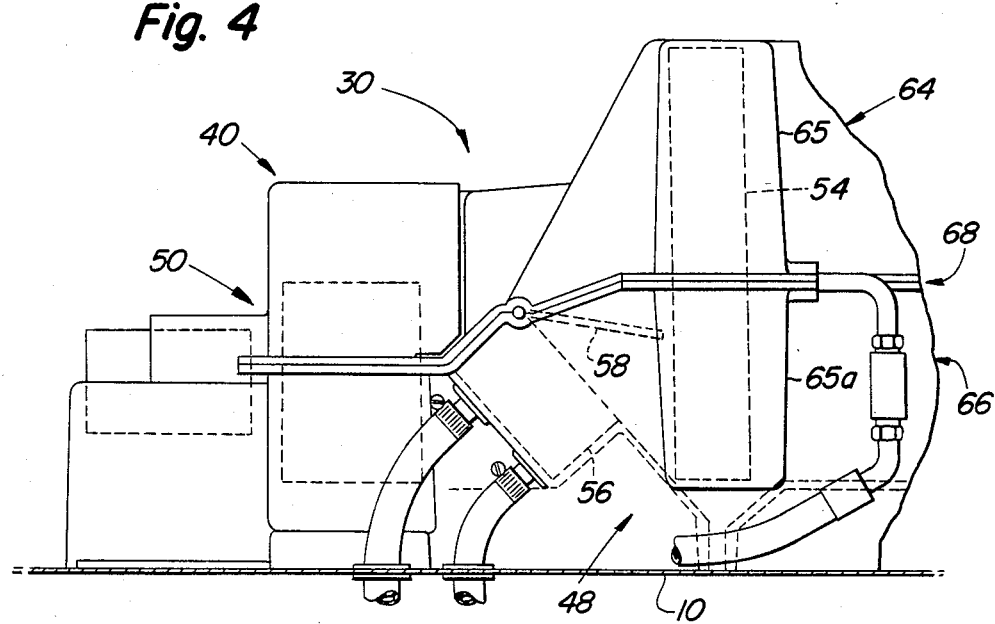
FIG. 4 is a partial, generally front view approximately on line 4—4 of FIG. 3.

FIGS. 3 and 4 show the actual configuration of the system, supported on the floor 10 of the cab in the left-hand rear corner immediately to the left of the operator seat 20. As can be seen, the principal components, fresh air filter 46, heat exchanger components 48 and the recirculating blower 50 are substantially coaxial and the longitudinal axis of the system extends approximately diagonally with respect to the floor 10 of the cab.

FIGS. 3 and 4 particularly illustrate the compactness of the system and indicate the covenience and simplicity of assembly and service provided by the generally horizontally split or divided casing 40 which consists essentially of upper and lower portions 64 and 66, respectively, meeting at a flanged and bolted joint 68. The lower portion 66 is mounted on the floor of the cab by suitable fasteners (not shown) and, in common with the upper portion 64, it has appropriate recesses suitably molded to position and support the various components of the system. An example is the support of evaporator 54 in recesses 65 and 65a (FIG. 4).

In assembly, internal flange-like members define a transverse wall 70 with a through aperture 72 for mounting the cylinder-type fresh air filter 46. The internal space of the casing upstream of the wall 70 will be referred to as a filter chamber 74. The precleaner 44 also extends vertically through it, immediately rearward of the fresh air filter 46. The upstream end of the casing 40 connects with the left-hand side wall 14 and an access door 76 provides convenient access from outside of the cab to the filter chamber 74.

Figure 6:
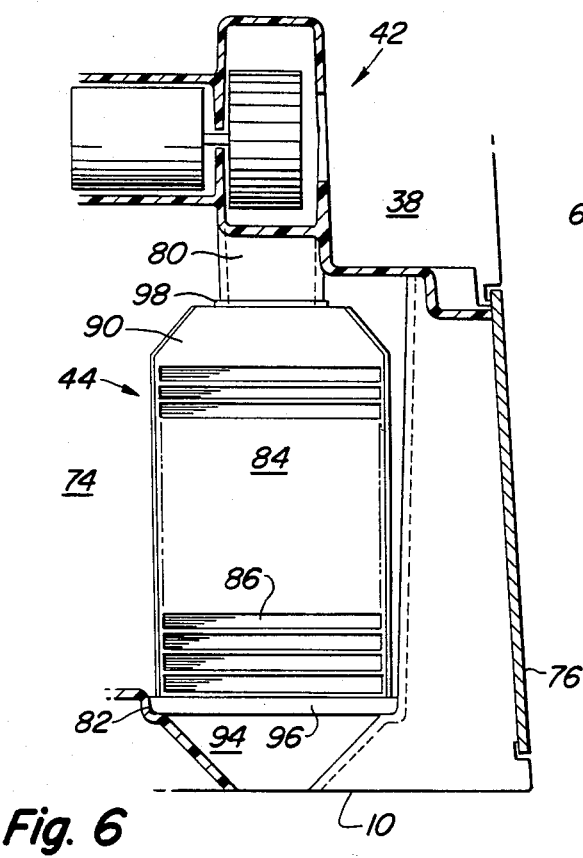
FIG. 6 is a view approximately on line 6—6 of FIG. 5.
Figure 5:
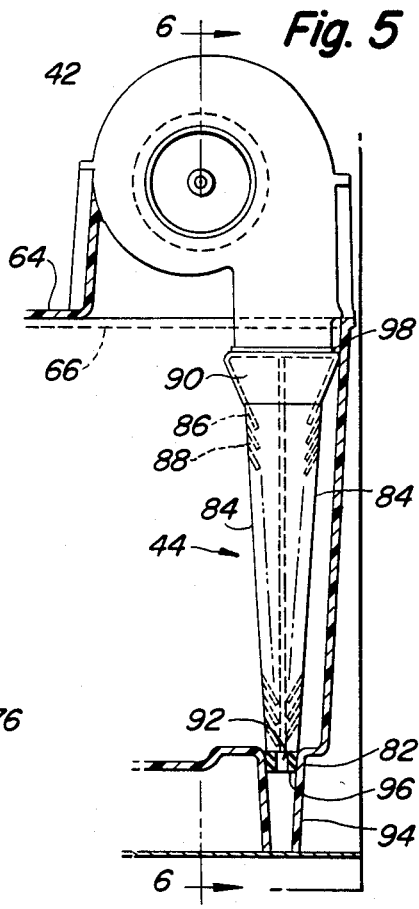
FIG. 5 is a partial rear view approximately on line 5—5 of FIG. 3 showing the pressurizing blower and precleaner.

The precleaner 44, seen best in FIGS. 5 and 6, is of the translational inertial type, the general principles of which are described in Society of Automotive Engineers paper 880B, "High Performance Air Cleaners for the Army's Industrial Gas Turbines" presented in 1964(see especially pages 3-6). It is positioned by and supported between a pressurizing blower nozzle or outlet 80, molded into the upper casing portion 64, and an open recess 82 molded into the floor of the lower casing position 66. The precleaner 44 is essentially a tapered passage of rectangular cross section in which opposite body walls 84 are louvered, with louvers 86 extending laterally and defining a series of upwardly and outwardly directed slots 88. A top transitional portion 90 connects with the pressurizing blower 80 and an exit slot 92 connects with a downwardly directed outlet 94 in the recess 82 in the floor 10 of the cab. The lower outlet end of the precleaner 44 is supported in the recess 82 on a resilient gasket or grommet 96. This serves as a compression "spring" permitting insertion of the precleaner 44 and holding it in place, with a collar 98 engaging the blower nozzle 80. It is thus conveniently removable for service or replacement.

In operation, the cab door 18 is closed and pressurizing blower switched on drawing outside air in through the roof louvers 32. These louvers screen out larger pices of airborne trash, leaves, etc., but, typically, dust-laden air enters and is delivered downwards, "charging" the precleaner 44. The way in which translational inertial precleaners operate is wellknown. The relatively high axial air velocity developed carries dust and dirt downwards at such velocity that the particles have sufficient inertia to resist the deflection and near reversal of direction it would require to pass through the slots 88. The tapered form of the precleaner helps maintain the air velocity and also develops a static pressure so that much of the air delivered by the blower 42 passes through the louvered slots 88 into the filter chamber 74. In a typical precleaner of this type, about 15 percent of the initial flow of air is lost or bled. In this embodiment it exits vertically downwards through the slot 92 and outlet 94 in the floor 10 of the cab taking with it 80 to 95 percent of the dust which had been entrained in the incoming air.

As is conventional the cab structure is designed to "leak" at a rate which requires a make-up air flow sufficient to maintain air quality in the cab at an acceptable level.

Normally, the pressurizing blower 42, preferably of the constant volume type, runs continuously when the combine is operated with the cab closed. When the recirculating blower 50, preferably variable speed, is also in operation, air from inside the cab is drawn through the recirculating filter 60 to mix with fresh or make-up air passing from the filter chamber 74 through the fresh air filter 46 into the mixing chamber 62. The combined air then passes throuh heat exhanger 48 and is conditioned (heated or cooled and possibly dehumidified) according to setting of conventional controls (not shown). Conditioned air is then distributed appropriately in the cab by the distribution duct 52.

Among advantageous features of an operator enclosure atmosphere conditioning system according to the invention, and evident from the drawings and above description are the compact space saving and functionally efficient disposition and layout of the principal components. The "in-series" arrangement of principal components means that all air is drawn through the system with mimimum pressure loss and turbulence. The unobtrusive integration of the precleaner 44 achieved by placing it alongside the fresh air filter 46 in the filter chamber 74 enhances the convenience of the location of the main fresh air filter 46. Both the filter and precleaner may be inespected or serviced conveniently through a single access door 76. The inconvenience of the typically bulky and unsightly external precleaner is avoided. Here, is is completely concealed and is self-cleaning, and its location is such that dust and dirt extracted by it is discharged downwards relatively close to the ground with a reduced possibility of fouling other parts of the combine.

We claim:

1. An atmosphere control system for an operator enclosure of a self propelled vehicle comprising:
   a housing inside the enclosure having walls and an inlet and an outlet in the walls both communicating externally of the enclosure;
   a pressurizing blower for drawing air through the inlet from outside of the enclosure;
   a precleaner within the housing for receiving and dividing the outside air from the pressurizing blower and passing a first portion of that air through the outlet substantially directly to the atmosphere and a second precleaned portion downstream in the housing, the precleaner functioning to concentrate any dust in the incoming air in the first air portion;
   a first air filter in the housing downstream of the precleaner for receiving and filtering the precleaned air portion;
   a second air filter screening second inlet in the housing walls, said second inlet being downstream of the first air filter and communicating with the enclosure and said second air filter being operable to filter air entering the housing from the enclosure;
   conditioning means, operable to treat a flow of air, disposed within the housing downstream of the first and second filters; and
   circulating blower means connected to the housing for drawing air through said first and second filters and through said conditioning means and distributing it in the enclosure.

2. The atmosphere control system of claim 1, wherein the circulating blower means includes a variable speed blower and a distribution duct extending within the enclosure.

3. An atmosphere control system for the operator enclosure of a self-propelled off-the-road vehicle carried within said enclosure, said enclosure having walls and a floor, comprising:
   a plurality of components including;
      fresh air inlet means associated with a wall of the enclosure;
      a pressurizing blower for drawing air through the inlet means;
      a precleaner for receiving air delivered by the pressurizing blower and passing a first portion of that air for delivery inside the enclosure and directing a second portion of the air substantially directly from the precleaner externally of the enclosure;
      a fresh air filter for receiving and filtering the first portion of air and passing it downstream;
      a heat exchanger for receiving the filtered first portion of air and passing it downstream; and
      a circulating blower for receiving and circulating within the enclosure air passed downstream by the fresh air filter;
   wherein said components, with respect to the flow of the first portion of air and the circulating air, are arranged in series so that all air entering the system passes downstream and through all components downstream of its point of entry.

4. The atmosphere control system of claim 3 wherein the precleaner is of the inertial type and the second portion of air is bleed air and said bleed air discharges generally downwards.

5. The atmopshere control system of claim 3 wherein the fresh air inlet means includes an inlet duct having an elevated inlet and further including distributing means, including a distributing duct downstream of the circulating blower.

6. The atmosphere control system of claim 3 wherein the pressurizing blower delivers air directly to the precleaner for charging the precleaner.

7. An atmosphere control system for an operator enclosure of a self-propelled off-the-road vehicle, the system including a set of principal components and the enclosure including walls and a floor, comprising:
   a generally horizontally extending casing for mounting on the floor of the enclosure and housing and supporting the principal components of the system and having an upstream fresh air inlet and a downstream conditioned air outlet and including an internal transverse fresh air filter wall having an aperture and defining a filter chamber of the casing upstream of the filter wall;
   a pressurizing blower in an air delivery relationship with the fresh air inlet for delivering fresh air from outside the enclosure to the filter chamber;
   a self-cleaning inertial precleaner for removing dust from the fresh air, extending in the filter chamber and having an inlet in a receiving relationship with fresh air from the fresh air inlet, a plurality of clean air outlets communicating with the filter chamber and a dust discharging outlet discharging externally of the filter chamber;
   a fresh air filter screening the aperture in the filter wall for filtering air passing downwstream from the filter chamber and through the aperture;
   a heat exchanger within the casing downstream of the filter aperture and upstream of the conditioned air outlet, the heat exchanger being spaced from the filter aperture so as to define a mixing chamber within the casing;
   a recirculating air filter inlet in the casing communicating with the mixing chamber; and
   a circulating blower associated with the conditioned air outlet for delivering conditioned air through said outlet and into the enclosure.

8. The atmosphere control system of claim 7 wherein the casing comprises an upper half and a lower half, the lower half being carried by the floor and the upper half being removable to provide access to the principal components of the system.

9. The atmosphere control system of claim 7 wherein the precleaner traverses the filter chamber from top to bottom and the dust discharging outlet is directed vertically downwards.

10. A fresh air filtering arrangement for the atmosphere control system of an operator enclosure of an off-the-road vehicle, said enclosure having walls and a floor, comprising:
   a filter chamber within the enclosure and adjacent a wall of the enclosure, said chamber having opposite first and second walls and an inlet and first and second outlets in said walls;
   an inertial precleaner extending within the filter chamber, between the opposite first and second walls of the chamber and having a charging air inlet ajdacent the first wall in communication with the filter chamber inlet, clean air outlets in communication with the filter chamber and a discharge end, including a bleed air outlet, adjacent the second wall in communication with the first outlet of the filter chamber, the filter chamber second wall including a recess and an axially compressible element carried in the recess, the recess and the compressible element engaging the discharge end of the precleaner, the recess positioning said end and the compressible element and forming a seal between the precleaner bleed air outlet and second wall and exerting a compressive axial force for retaining the precleaner between the opposite walls, the compressibility of the element facilitating the installation and removal of the precleaner;

a clean air filter screening the second outlet of the filter chamber; and power means for delivering air under pressure to the inlet of the filter chamber.

11. A fresh air filtering arrangement for the atmosphere control system of an operator enclosure of an off-the-road vehicle, said enclosure having walls and a floor, comprising:

a filter chamber within the enclosure and adjacent the floor of the enclosure, said chamber having first and second walls and an inlet and first and second outlets in said walls, the second wall of the filter chamber extending generally horizontally adjacent the floor of the enclosure and including the first outlet and said floor including an aperture registering with the first outlet;

an inertial precleaner of the translational inertial type extending generally vertically within the filter chamber and having a charging air inlet in communication with the filter chamber inlet, clean air outlets in communication with the filter chamber and a discharge end, including a bleed air outlet, in communication with the first outlet of the filter chamber so that the bleed air discharge of the precleaner is generally vertically downwards through the aperture in the floor of the enclosure;

a clean air filter screening the second outlet of the filter chamber; and power means for delivering air under pressure to the inlet of the filter chamber, comprising a pressurizing blower having a delivery nozzle communicating directly with the charging air inlet of the precleaner.

* * * * *